UNITED STATES PATENT OFFICE.

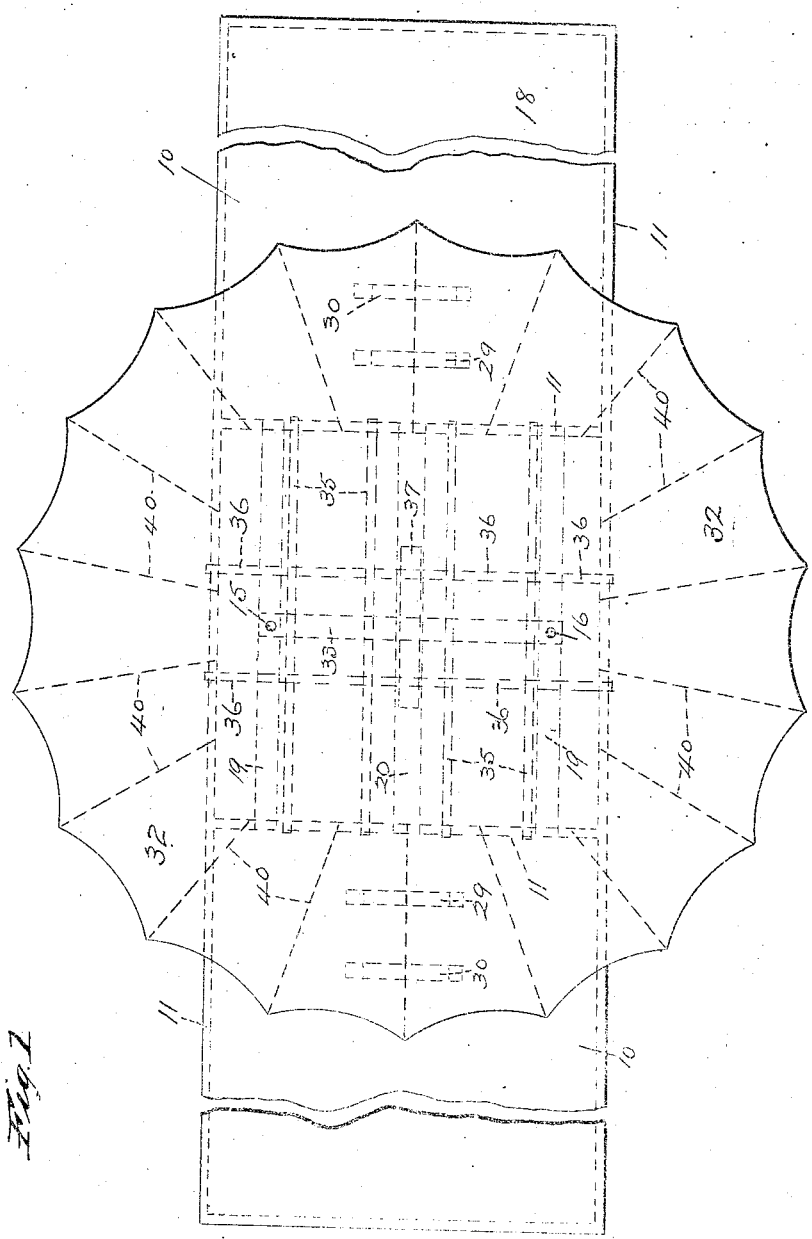

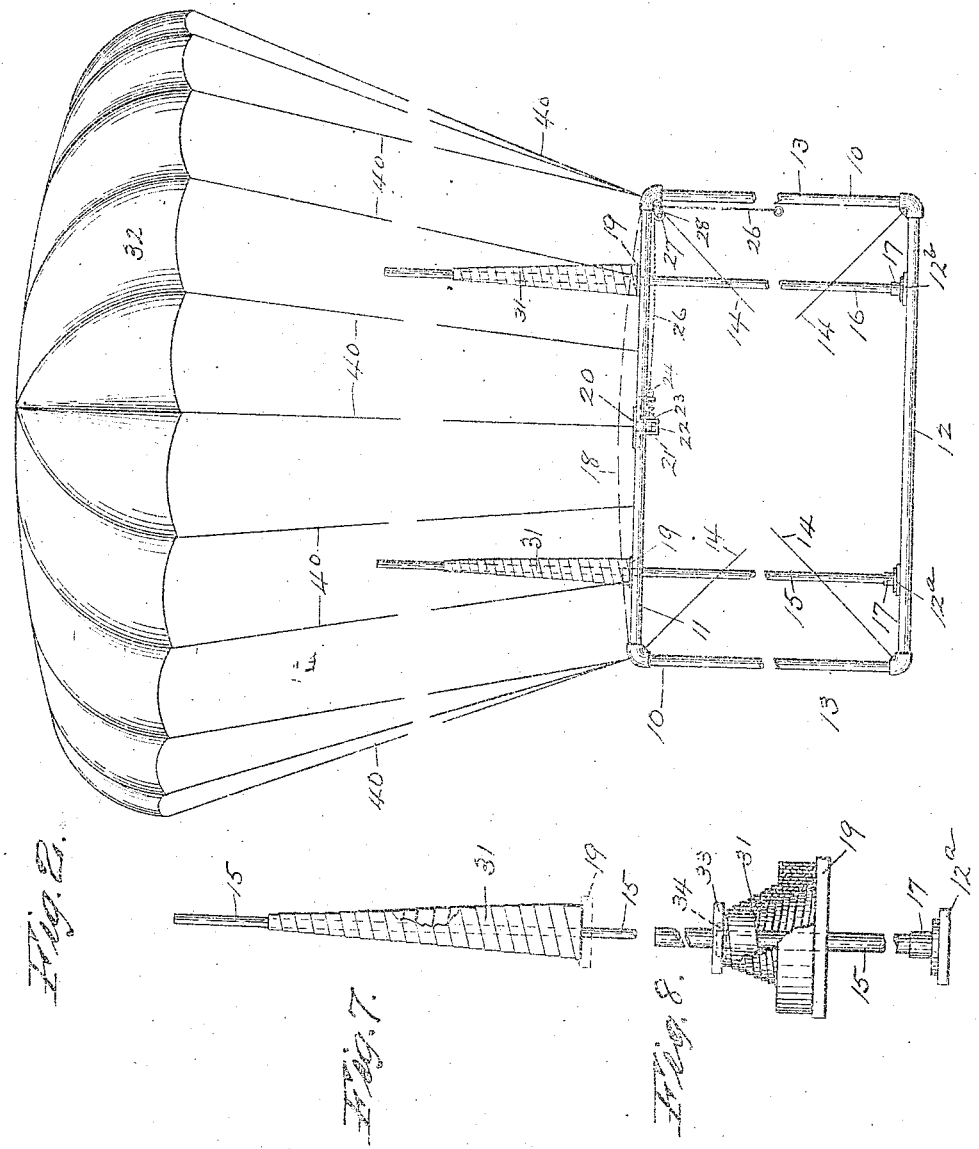

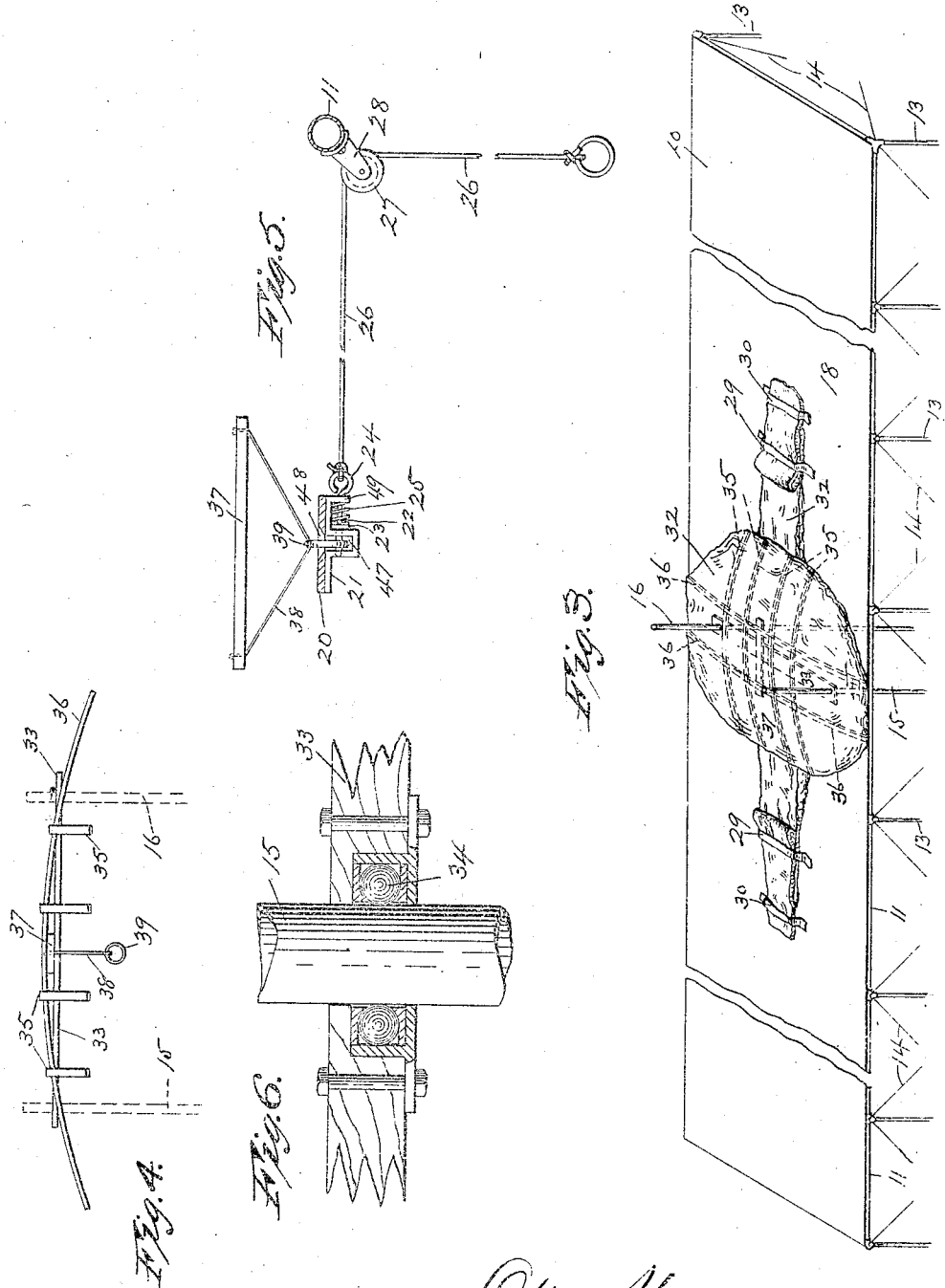

OTTO KROPP, OF WEST HOBOKEN, NEW JERSEY.

PARACHUTE ATTACHMENT FOR AEROPLANES.

1,101,196.

Specification of Letters Patent. Patented June 23, 1914.

Application filed July 17, 1913. Serial No. 778,509.

*To all whom it may concern:*

Be it known that I, OTTO KROPP, a citizen of the United States, and resident of West Hoboken, in the county of Hudson and State of New Jersey, have invented certain new and useful Improvements in Parachute Attachments for Aeroplanes, of which the following is a complete specification.

My invention relates, more particularly, to construction of parachutes for aeroplanes, to means for effectively, and practically instantaneously setting the parachute in operative condition, irrespectively of the angle at which the aeroplane may be tipped, longitudinally or laterally, and to devising of means for so attaching it to, or combining it with, an aeroplane, to the extent as it is necessary for the purpose of combining the means, serving one purpose of my invention, with those serving the other, all of the said means coöperating for the attaining of the objects of my invention, which embrace the providing of an aeroplane with a parachute of sufficient carrying capacity, to safely sustain it, and to effectively prevent its being turned over even if crippled by an accident, and to enable the aviator to steer it to a landing, or to effect its gradual and slow descent on an even keel, if the steering apparatus of the aeroplane is broken or not operatable.

An aeroplane, or so much of it as is necessary for the purposes of these specifications, and for illustrating my improved parachute attachment, and of the other features of my invention, is shown in the accompanying drawings, wherein—

Figure 1 is a plan view of the aeroplane with the parachute expanded, as it is when in use; Fig. 2 is an end elevation thereof; Fig. 3 is a perspective of the aeroplane with the parachute folded up and secured to the plane; Fig. 4 is a detail, showing the side elevation of the frame for the parachute, its cover being omitted; Fig. 5 is another detail view, showing a side elevation of the means for securing the parachute in its inactive position and the means for releasing it; Fig. 6 is still another detail view, a sectional view of one of the bearings provided in the supporting bar of the frame of the parachute, and of one of the guide-posts, whereon the frame of the parachute glides when released; Figs. 7 and 8 are other detail views of one of the springs, whereby the parachute is set in action, Fig. 7, showing the spring extended, and Fig. 8, showing it when compressed underneath the frame of the parachute.

The drawings represent a portion of an aeroplane of any of the many constructions, in which the frame is composed of bars 11 and 12, joined together by posts 13, and rigidly braced by cross wires 14. The rudder, the raising and lowering planes, and their operating gears are not shown; that not being necessary for the understanding of my invention.

The posts 15 and 16 are set in flanged collars 17, brazed to plates $12^a$ and $12^b$, secured to the bars 12, and in plates 19, brazed to the bars 11 of the upper plane, to provide rigid and strong guides for the bar 33 of the frame of the parachute. Posts 15 and 16 are made sufficiently long to hold the parachute against being sidewise displaced before it fills and spreads by the resistance of the inflowing air. Springs 31, slid upon the ends of posts 15 and 16, projecting above the plates 19, are made of spirally coiled bands of steel, so that when compressed, the coils lie within each other, as shown in Fig. 8. This reduces the space into which the spring may be compressed, to the width of the band of which the spring is made, besides resulting in the production of much greater effective capacity of the springs. When fully extended, the springs 31 do not quite reach the ends of posts 15 and 16, as will be seen in Figs. 2 and 7, but they are made sufficiently long to lift the frame, and the cover of the parachute, safely as high as necessary, above the upper plane, to insure the inflow of sufficient volume of air underneath to inflate the parachute, to lift it from the guide-posts 15 and 16, and to stretch the connecting ropes 40, whereon the aeroplane is then suspended from the parachute.

The frame comprising bars 35 and 36, and also the cross-bar 37 and the bar 33, is made of some light, but strong material. This bar 33 is secured to cross-bars 35, and to other bars, 36, being also secured thereto, preferably at a right angle thereto. Cross-bar 37 is secured to bars 36 to lie parallel to the bars 35, and a wire, or chain 38, with the ring 39, suspended thereon, is secured thereto. This frame is secured to the central portion of the parachute covering 32. The longitudinal dimensions of the bars 35 and 36 are equal and preferably exceed the width of the bi-plane, and the diameter of the covering 32 exceeds the dimensions of its supporting framework proportionately to the weight of the aeroplane. At equi-distant points on its circumference cords 40 are suitably attached thereto, connecting the parachute to the aeroplane, as shown in Figs. 1 and 2. Bar 33 is perforated at its ends, circular ball bearings 34 being provided in the perforations, to enable the bar 33 to freely slide on the posts 15 and 16.

Between the posts 15 and 16, a centrally perforated plate 20 is secured to the upper frame of the aeroplane, and bracket 21 may be secured thereto, or made integral therewith. In this bracket 21, shaped as shown in Fig. 5, to form a recess 47 underneath the aperture 48 in the plate 20 and the flange 49, the locking and releasing mechanism of the parachute is mounted. The locking and releasing mechanism comprises, besides the bracket 21, also the bolt 22, a collar 23 and eye 24 formed thereon, bearings in the bracket 21 for the bolt 22, and some suitable mechanism for reciprocating the bolt in its bearings, as for instance the spring 25, and the pull-rope 26, connected to the bolt 22, and passed over pulley. The bolt 22 is journaled in the bracket 21, as shown in Fig. 5, and between the flange 49 of the bracket and the collar 23 the spring 25 is slid thereon. The purpose of this spring is to keep the bolt 22 in its position, interlocking with the ring 39, when the latter is drawn. Pull-rope 26 is attached to the eye 24 of the bolt 22, and passed over the pulley 27, mounted in lugs 28, secured to the bar 11, in position to bring the drop end of the pull-rope where it may be conveniently reached from the aviator's seat. In place of the pull-rope, a suitable lever arrangement may be employed for moving the bolt. I have, however, determined upon the means herein shown and described, knowing from experience, that by this arrangement the great probability of confusion, and of the mistakes, resulting therefrom, are avoided.

The parachute is normally folded upon the aeroplane. It is held in its inactive position and place by the bolt 22, interlocking with the ring 39, as above explained. The portion of the covering 32 of the parachute overhanging the frame and the ropes, connecting it with the aeroplane, are gathered and folded under the frame forward and aft; those at the sides are drawn out and folded with the covering as shown in Fig. 3. To facilitate a quick spreading out of the parachute cover, the folded covering 32 and the ropes are laid out toward the wings of the aeroplane, and then, after being folded lengthwise, are laid in transverse folds, or loops, as shown in Fig. 3; the folds, or loops, are then secured in place by straps 29 and 30. This way of folding the covering of the parachute permits a rapid and easy withdrawing of the covering 32 from underneath of the straps by the pulling (lifting) action, exerted upon its central portion by the force of the springs 31, when reacting upon the bar 33 of the frame of the parachute.

The releasing and spreading of the parachute, and setting it into operative position, above the aeroplane, is effected by a pull upon the pull-rope 26, the handle of which is located within easy reach of the aviator. By pulling it downward the bolt 22 is withdrawn from the recess 47; this releases the ring 39, holding the parachute frame down, and springs 31 depressed. When thus released, the springs 31 react, bearing upon the bar 33 of the parachute frame, and force the frame and the parachute cover, secured thereto, upwardly along the posts 15 and 16. This action of the springs 31 lifts the parachute for a sufficient distance to admit a rapid inflow of air underneath, to inflate the parachute. It will be noted, as shown in Fig. 2, and as hereinbefore explained, that the area of the parachute largely exceeds that of the aeroplane, and that the connecting ropes 40 are secured to the aeroplane so as to support it over its center of gravity. The center of gravity will then, of course, be so much below where it originally was, in the aeroplane, as the supporting resistance is transferred from the planes 18 to the parachute, and when the ropes 40 are stretched out, the parachute breaks and begins to retard the decent of the aeroplane.

The frame of the parachute being permanently spread, and so constructed, that the force, initially raising the parachute, acts directly upon it to lift the parachute from the aeroplane; the danger of any mistake or failure in launching the parachute is obviated. The guide-posts 15 and 16, coöperating with the rigid frame, prevent a sidewise displacing of the parachute, and as the springs 31 raise the parachute a sufficient distance from the aeroplane to insure the inflow of air underneath the parachute in sufficient volume to fill it, any tendency of the aeroplane to turn over, as it may have, in case of displacement of its center of gravity in case of accident, or of an error of the aviator in operating the steering devices, is thereby overcome, or at least sufficiently counteracted to prevent it.

The objects of my invention are thus attained by the herein described construction of the parachute, the manner of its connective combination with the aeroplane, and by the coöperative action therewith of the mechanism for safely, and practically instantaneously, setting the parachute in action.

I claim as my invention:

1. A parachute attachment for aeroplanes, comprising a rigid frame, approximately co-extensive with the width of the aeroplane, a covering of greater area than the frame, secured thereto; ropes, connecting the edge of the covering with the framework of the body of the aeroplane; means for securing the parachute in folded condition to the aeroplane; compressible springs underneath the frame and means for releasing the springs to raise the frame from the aeroplane, and means for guiding and holding the frame, while thus being raised, against sidewise displacement; substantially as herein shown and described.

2. A parachute attachment for aeroplanes, comprising a rigid frame approximately co-extensive with the width of the aeroplane, a covering of greater area than the frame, secured thereto; ropes, connecting the edge of the covering with the framework of the body of the aeroplane; means for securing the parachute in folded condition to the aeroplane; bearings in the frame of the parachute, and guide-posts, secured in the structure of the aeroplane in position to engage in the bearings in the said frame; and means for unfolding and forcibly raising the parachute from the aeroplane; substantially as herein shown and described.

3. A parachute attachment for aeroplanes, comprising a rigid frame approximately co-extensive with the width of the aeroplane, a covering of greater area than the frame, secured thereto; ropes, connecting the edge of the covering to the framework of the body of the aeroplane; a bar, secured to the frame of the parachute; bearings in the bar; guide-posts, secured in the structure of the aeroplane, in position to engage in the bearings in the bar; compressible springs underneath the bar; means for drawing the parachute frame upon the aeroplane, thereby compressing the springs; means for securing the parachute frame in this position, and means for disengaging it and releasing the springs, substantially as herein shown and described.

4. A parachute attachment for aeroplanes, comprising a rigid frame approximately co-extensive with the width of the aeroplane, a covering of greater area than the frame, secured thereto; ropes, connecting the edge of the covering to the framework of the body of the aeroplane; bearings in the rigid frame; guide-posts, secured in the structure of the aeroplane in position to engage in the said bearings; compressible springs underneath the frame, a ring and means connecting it to the frame; a plate secured to the aeroplane and a slot in the plate; a bracket underneath the plate, a recess underneath the slot in the plate; bearings in the bracket adjoining the recess; a bolt fitted into the bearings and extending across the recess; and means, connected with the bolt for moving it; substantially as herein shown and described.

OTTO KROPP.

Witnesses:
R. A. PIPER,
VERONICA BRAUN.